United States Patent [19]
Stinger

[11] 3,878,362
[45] Apr. 15, 1975

[54] ELECTRIC HEATER HAVING LAMINATED STRUCTURE

[75] Inventor: Henry Joseph Stinger, Devon, Pa.

[73] Assignee: E. I. du Pont de Nemours and Company, Wilmington, Del.

[22] Filed: Feb. 15, 1974

[21] Appl. No.: 442,907

[52] U.S. Cl. .............. 219/528; 219/543; 219/549; 338/211
[51] Int. Cl. ..................... H05b 3/34; H05b 3/54
[58] Field of Search .......... 219/211, 522, 527, 528, 219/543, 549; 338/210, 211, 212

[56] References Cited
UNITED STATES PATENTS

| | | | |
|---|---|---|---|
| 2,277,772 | 3/1942 | Marick | 219/211 |
| 2,404,736 | 7/1946 | Marick | 219/528 X |
| 2,473,183 | 6/1949 | Watson | 219/543 |
| 2,961,522 | 11/1960 | Hammer | 219/543 X |
| 3,060,303 | 10/1962 | Skoglund et al. | 219/549 |
| 3,268,846 | 8/1966 | Morey | 338/212 |
| 3,287,684 | 11/1966 | Armbruster, Jr. | 338/211 |
| 3,336,557 | 8/1967 | Lund et al. | 338/210 |
| 3,387,248 | 6/1968 | Rees | 338/211 |
| 3,397,302 | 8/1968 | Hosford | 219/528 |
| 3,514,581 | 5/1970 | Rocholl et al. | 219/522 |

Primary Examiner—Volodymyr Y. Mayewsky

[57] ABSTRACT

A laminated composite polymeric structure having beneficial utility as an electric heating element which is thin, flexible, durable and efficient has the following components:

(A) a bottom layer composed of a film of electrically insulating polymeric material, (B) in superposed adherent relation with layer (A), a discontinuous layer of electrically conductive elastomeric material containing electrically conductive carbon black dispersed in a heat-resistant elastomer, said discontinuous layer covering substantially all of layer (A) except for spacing areas which occur at predetermined intervals along the length of layer (A), said spacing areas extending across the width of layer (A) whereby layer (B) is divided into a series of coated areas of predetermined length, (C) at least two spaced-apart conductor wires in intimate contact with layer (B) and extending substantially the entire length of the laminated structure, and (D) a top layer composed of a film of electrically insulating polymeric material in superposed contact with layer (B) and said spacing areas of layer (A).

3 Claims, 3 Drawing Figures

PATENTED APR 15 1975    3,878,362

ELECTRIC HEATER HAVING LAMINATED STRUCTURE

BACKGROUND OF THE INVENTION

This invention relates to a laminated structure which is useful as an electric heating element. Preferred embodiments of the invention concern such a structure in the form of a flexible sheet or strip which is (a) very thin and durable, (b) highly efficient as a heating element, (c) practical to manufacture by a continuous process and wind up on a storage spool and (d) easier and more economical to install as an electric heater in the ceiling of rooms, mobile homes and the like than some of the best prior art products which have been made for this purpose.

SUMMARY OF THE INVENTION

The present invention provides a laminated structure useful as an electric heating element which comprises A. a bottom layer composed of a film of electrically insulating polymeric material, B. in superposed adherent relation wtih layer (A), a discontinuous layer of electrically conductive elastomeric material containing electrically conductive carbon black dispersed in a heat-resistant elastomer, said discontinuous layer covering substantially all of layer (A) except for spacing areas which occur at predetermined intervals along the length of layer (A), said spacing areas extending across the width of layer (A) whereby layer (B) is divided into a series of coated areas of predetermined length, C. at least two spaced-apart conductor wires in intimate contact with layer (B) and extending substantially the entire length of the laminated structure, and D. a top layer composed of a film of electrically insulating polymeric material in superposed contact with layer (B) and said spacing areas of layer (A).

DESCRIPTION OF PREFERRED EMBODIMENTS

Figure 1:
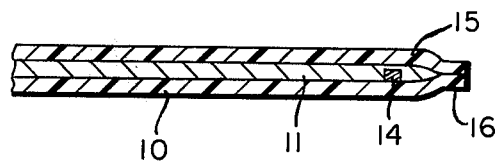
FIG. 1 is an enlarged fragmentary cross-sectional view (taken on line 1 of FIG. 2) of an embodiment of the present heating element.

Component(A) of the novel product as described above (shown as Item 10 in FIG. 1) is the bottom film of electrically insulating polymeric material. This bottom film is in adherent relation with the conductive elastomer layer (B) shown as Item 11 of FIG. 1. Component (D), shown as Item 15 in FIG. 1 is the top film of electrically insulating polymeric material. This top film is preferably in adherent relation with conductive elastomer layer (B) and the portions of the bottom film which have not been coated with the conductive elastomer layer, including the "spacing areas" (see Item 12 of FIGS. 2 and 3) which extend across the width of the bottom film between the "coated areas" (see Item 13 of FIGS. 2 and 3).

Among the most useful embodiments of the present structure are those wherein the coated areas 13 measure about 11–15 inches in the direction parallel with the conductor wires, and the spacing areas 12 measure about 1–5 inches in the same direction.

Component (C) of the product is composed of at least two conductor wires, shown as Item 14 in the drawings. These wires, which lie between the insulating films (A) and (D), are in intimate contact with the conductive elastomer of layer (B); they are preferably in adherent relation with the conductive elastomer layer and/or at least one of the insulating films which make up the top and bottom layers (A) and (D). Thus, the wires are preferably bonded within the structure between the insulating films. The wires can be made of any suitable highly conductive material, for example copper, brass or aluminum. The wires provide a means for electrically connecting the structure to an electric power supply. It is sometimes preferred to use wires which have been coated on at least one side with an adhesive, for example a conductive polyester adhesive composition formed by mixing a linear copolyester with carbon black and a volatile solvent or diluent. One skilled in the art will be able to select the proper size, number, and spacing of the wires to fit the requirements of the intended use of the product. In many cases it is convenient to use wires having a thickness of about 0.5–4 mils (preferably about 1–2 mils) and a width of about ⅛ to 1 inch (preferably about ½ to ¾ inch).

In certain applications of the invention, one will prefer to prepare the structure so that its total width is about 50–60 inches, and so that it contains four substantially evenly-spaced parallel conductor wires having a distance of about 16–20 inches between each wire and the next one. Such a product has valuable advantages, for example when used as a single-strip heater in the ceiling of a mobile home.

Each of the insulating film components (A) and (D) can be selected from known polymeric materials which have the desired insulating quality for the particular application, and which will not undergo any harmful melting or other damage under the conditions to be employed in preparing and using the laminated structure. Each film is preferably a highly flexible, non-elastomeric durable plastic material which is impervious to the conductive elastomer composition during preparation of the product. A flexible polyester film is preferred in many applications, with special preference for a polyethylene terephthalate film on at least one side (preferably both sides) of the conductive elastomer layer. Also useful as the insulating film on one or both sides of the conductive elastomer layer are flexible insulating films of such materials as polyimides, fluorocarbon plastics (e.g., polyvinyl fluoride), polyethylene, polypropylene, and other known insulating polymeric materials.

The film can consist of a layer of the insulating polymer by itself, or the film can be composed of a layer of the polymer adhered to another material, for example a suitable fabric or other fibrous sheet material. The film of polymer can contain various additives known to be useful in insulating films of polymeric materials.

The elastomer used in preparing the component (B) conductive elastomer layer can be selected from known elastomers which have the heat resistance and other properties desired in a particular application. The elastomer can be mixed with various additives known to be useful in conductive elastomer compositions in addition to the carbon black component. A fluorocarbon elastomer is especially preferred in many applications. A preferred type of fluorocarbon elastomer (fluoroelastomer) is an elastomeric copolymer of vinylidiene fluoride and at least one other fluorine-containing monomer. The "other fluorine-containing monomer" is usually an ethylenically unsaturated monomer containing at least one fluorine atom substituent on each double-bonded carbon atom. The copolymer is preferably composed of at least one of the following: copolymers of vinylidene fluoride and hexafluoropropylene or pentafluoropropylene; copolymers of vinylidene fluoride, tetrafluoroethylene and hexafluoropropylene or pentafluoropropylene; and copolymers of vinylidene fluoride, a perfluoroalkyl perfluorovinyl ether and tetrafluoroethylene. Especially preferred are vinylidene fluoride/hexafluoropropylene copolymers in which the monomers are combined in a molar ratio of about 85:15 to 50:50. Also very useful is a copolymer of about 30–80 moles of vinylidene fluoride, 15–40 moles of hexafluoropropylene, and 5–30 moles of tetrafluoroethylene.

Copolymers of vinylidene fluoride and hexafluoropropylene are described in U.S. Pat. No. 3,051,677 issued to Rexford. Copolymers of vinylidene fluoride, tetrafluoroethylene and hexafluoropropylene are described in U.S. Pat. No. 2,968,649 issued to Pailthorp and Schroeder. Copolymers of vinylidene fluoride and pentafluoropropylene are described in U.S. Pat. No. 3,331,823 issued to Sianeis, et al.; and copolymers of these two components with tetrafluoroethylene are described in U.S. Pat. No. 3,335,106 issued to Sianesi, et al. Copolymers of vinylidene fluoride, a perfluoroalkyl perfluorovinyl ether (having 1–5 carbon atoms in the alkyl group) and tetrafluoroethylene are described in U.S. Pat. No. 3,235,537 issued to Albin and Gallagher.

Among the other elastomers which can be used in some applications for preparing component (B) are silicone elastomers, EPDM elastomers and polychloroprene elastomers.

In some of the most useful embodiments of the invention, each of the insulating films (A) and (D) has a thickness of about 0.5–15 mils, and conductive elastomer layer (B) has a thickness of about 0.05–0.45 mil. There can be a thin layer of the conductive elastomer in interposed adherence with one or both sides of the component (C) wires and the nearest insulating film.

The novel laminated structure can be prepared by a process which comprises the following steps (reference is made to the numbered items of the drawings):

1. applying suitably-spaced conductor wires 14 to the top surface of bottom insulating film 10,
2. applying discontinuous conductive elastomer layer 11 to the top surface of the structure resulting from step (1) (e.g., by using a suitable known roller-printing apparatus) so that the elastomer layer is divided into coated areas 13 of suitable length by the uncoated spacing areas 12, and preferably so that there is a narrow uncoated area long both edges of the structure to facilitate the formation later of a bonded edge 16,
3. applying top insulating film 15 to the top surface of the structure resulting from step (2) and
4. pressing the resulting assembly of layers at a temperature, pressure and time cycle sufficient to cause the components of the assembly to become bonded together into a composite structure of the type shown in FIG. 1.

In step (4) of the above-described process, the assembly of layers is preferably pressed for a period of about 0.1 second to 30 minutes while the assembly is at a temperature of about 100°–250°C. The heating of the layers to be bonded can be done before or during the pressing operation. I especially prefer to carry out the pressing by passing the assembly between at least one pair of heated pressure rolls, using a pressing period of about 0.1–3 seconds and a pressure on the assembly of about 15–2,000 pounds per lineal inch of assembly width. Excellent results are often obtained with a pressing period of about 0.1–1 second. This illustrates the surprising speed at which the product can be made. The components can be fed in a continuous manner from large storage rolls to a continuous pressing apparatus, and the product can be continuously passed from the press through a cooling zone and wound on storage spools. Also, I often prefer to use a pressing temperature that is close to the highest temperature which will not damage (e.g., cause harmful decomposition) any component of the assembly, for example just below the decomposition temperature of the conductive elastomer layer or the insulating film, whichever is lower. This tends to give the best film-to-elastomer adhesion and the best conductivity values of the elastomer layer in the final product; it also tends to permit a rapid rate of production. It will be apparent that at least one of the pressure rolls can be covered with an adhesion resistant material (e.g. polytetrafluoroethylene). for example when pressing a structure temporarily having an insulating film on only one side of the conductive elastomer layer.

A modification of the above-described process can also be used (although it is not usually preferred) wherein steps (1–3) are repeated, and then fasteners are used to attach the top film to the rest of the structure. For example, the assembly resulting from step (3) can be placed in contact with the support members of a ceiling of a mobile home, and staples or tacks can be used to fasten the laminated structure to said support members at closely spaced points along the spacing areas 12 and along both uncoated edges. However, it is usually advisable to carry out a pressing operation such as the above described step (4) before the structure is fastened in the location where it will be used as an electric heater.

In preparing the conductive elastomer layer, the elastomer is mixed with enough carbon black to give it the desired conductivity while retaining suitable strength and other necessary properties. It is usually mixed with about 10–100 parts of conductive carbon black per 100 parts of elastomer; about 35–100 parts of carbon black are often preferred. Acetylene black is used in many of the best embodiments of the invention. Most other types of carbon black tend to cause problems in preparing the elastomer layer or tend to make it difficult or impossible to obtain the desired product quality. However, results which are useful for some applications can also be obtained with other types of carbon black having high electrical conductivity, for example high structure furnace black.

The component (B) conductive elastomer layer can be formed by applying the elastomer composition to one or both of the insulating films in the discontinuous pattern described above. When using a print-roller method of applying the elastomer composition, the composition can be made up as a liquid coating composition in which the elastomer is dissolved or dispersed in an organic solvent that does not harm the insulating film, or is dispersed in water to form a latex. A solution coating method is especially preferred; and a gravure printing roll is a very useful part of the coating apparatus. The conductive elastomer layer can also be formed by silk-screen coating, spray coating with the aid of a suitable masking device, brush coating with the aid of a suitable stencil, and other known methods of forming patterned coatings, films and the like from polymer compositions.

Component (B) can serve as an adhesive which bonds the structure together. The insulating films can be treated by known methods to enhance adhesion. The films can be bonded together in the spacing and edge areas by heat sealing during the pressing operation, preferably with the aid of a very thin adhesion-enhancing coating applied to at least one of the films.

One or both of the insulating films can have a known type of adherent coating (e.g., on the exterior surface) of a heat reflective material or a heat absorbing material.

The voltage applied to the laminate of this invention when used as a heater will generally depend upon the voltage available at the point of use of the laminate. Particularly useful are 6 volt, 12 volt, 115 volt, 230 volt, and 480 volt power supplies. The 115 volt and 230 volt power supplies are usually preferred.

The temperature of operation of the laminate as a heating element will depend upon such factors as the heat resistance of the film used as the insulating layer and the type of elastomer used in the conductive layer. When using a polyester film and a preferred type of electrically conductive fluoroelastomer layer, temperatures at least as high as about 150°C. can often be obtained.

About 20 watts/ft.$^2$ at 230 volts across a 1.5-foot width of a polyester film/conductive fluoroelastomer laminate is a typical heat value. The laminate temperature depends on heat losses from the laminate. Typical maximum values for laminates installed behind ½ inch thick gypsum board are about 50°–70°C. Other power levels and temperatures are attainable by varying, for example electrode placement, and thickness and composition of the elastomeric layer. Power levels in excess of 100 watts/ft.$^2$ at temperatures above 100°C. have been attained with polyester film/conductive fluoroelastomer laminates of the present invention.

Laminated structures are obtainable according to the present invention which are very useful as electric heating elements. The product can be made by fast and economical production methods (for example, by rapidly passing the assembled layers between heated rolls); and preferred embodiments of the product can readily be produced so as to have a desirable combination of characteristics including low thickness, little or no flammability, high flexibility, durability and heating performance, and excellent retention of useful electrical properties including low resistivity during storage and use.

The invention provides electric heating structures which are exceptionally easy and economical to install in the ceilings or other areas of mobile homes, houses and the like. A typical installation can be carried out by (1) unwinding a long strip of the product from a storage roll, (2) cutting a long section of the strip to the desired length along the spacing area 12 at each end of the section of strip to be used, and (3) stapling the strip of laminated material to the ceiling support members which are in contact with the spacing areas adjacent to each of the coated areas 13. Each of the spacing areas 12 defines the position of a ceiling support member, and receives a row of staples. After the cutting operation of step (2), there is at least a portion of a spacing area 12 at each end of the strip. Since the spacing area is composed of bonded-together insulating films 10 and 15, there is no need to apply insulating tape along the entire cut end of the strip as is required with typical prior art laminated heaters cut from a long strip having a continuous interlayer of conductive polymeric material. The end-taping operation required with prior art structures is costly and difficult because only high quality expensive tape (e.g., polyimide type) can be used to meet the established safety requirement, and the tape commonly used is difficult to handle and apply.

Furthermore, since the present structure contains spacing areas composed of bonded-together insulating films at numerous locations along the length of the strip (e.g., so that there is a spacing area in contact with each ceiling support member when the product is installed on a ceiling), there is no need to drive staples through areas of the product which contain a conductive elastomer layer as is often necessary with the prior art laminated heaters in order to achieve satisfactory fastening of a wide (e.g., 56 inch) strip of the laminated material. Thus, the present product can be used in many applications where the prior art laminated heaters cannot be used because stapling through areas containing the conductive layer is not permitted for safety reasons in certain applications such as the construction of mobile homes.

The present invention also facilitates the manufacture of a laminated heater having any particular power level within a given range. As will be understood by one skilled in the art, this is readily accomplished by selecting a suitable ratio between the size of the spacing areas and the size of the coated areas.

It is also an advantage of the present product that if the structure is accidentally damaged so that there is a defect such as a small cut or crack in the laminate within the coated area, the defect does not tend to spread to other areas of the structure and render the entire heater inoperable as can happen in prior art laminated heaters.

The beneficial utility of the preferred structures is further illustrated as follows: They retain useful conductivity for a surprising length of time; they require no costly curing operation like certain prior art products; they permit the use of very thin and flexible elastomer layers and insulating layers; and after they are fastened to a ceiling or wall structure, sections are easily cut out and removed for placement of light fixtures and the like; and they have minimum shock hazard in areas where nails and the like are put through them. Sheets or strips of the composite structure can be installed in the walls, floors, or ceilings of rooms for use in heating the rooms, or they can be used in other space-heating applications, or as contact heaters for pipe lines, tanks, and other kinds of apparatus. Preferred embodiments of the product are very resistant to damage by physical and chemical means during installation and use; and the product does not have to contain special supporting or reenforcing components (e.g., glass fabric) which are needed in certain prior art structures and which tend to make the product too costly, too thick, or too high in resistivity for certain applications. However, one can include glass fabric or the like in the present product for certain end uses if he wishes.

The following examples illustrate the invention; all amounts are by weight unless otherwise indicated.

EXAMPLE 1

Figure 3:
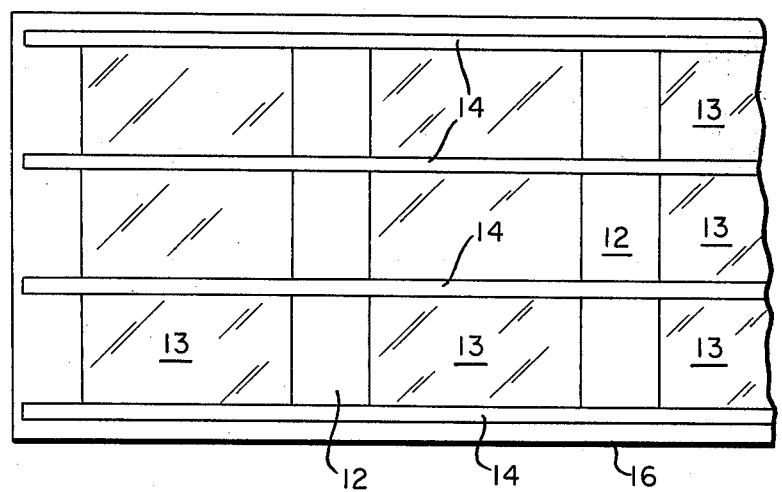
FIG. 3 is a bottom plan view of an embodiment of the present heating element which differs from that of FIG. 2 mainly in that it is much wider and has four conductor wires instead of only two.

A laminated structure which is useful as an electric heating element and having the structure illustrated in FIGS. 1 and 3 of the drawings is prepared by the steps of 1. providing a fluoroelastomer which is a copolymer containing in each 100 parts of copolymerized units 60 parts of vinylidene fluoride and 40 parts of hexafluoropropylene;

2. making a conductive fluoroelastomer composition by thoroughly mixing the following in a ball mill: 100 parts of the fluoroelastomer provided in step (1), 35 parts of acetylene black, 15 parts of magnesium oxide, 350 parts of methylethylketone and 350 parts of butylacetate; this is done by ball-milling particles of the fluoroelastomer with the solvents to form a fluoroelastomer solution, adding the other two ingredients and ball-milling until the composition is substantially free of coarse particles;

3. diluting the composition obtained in step (2) until it has a viscosity suitable for application by a Gravure printing apparatus; this is done by adding methylethylketone with stirring until the composition has a Brookfield vidcosity of 475 centipoises using a No. 2 spindle at 50 rpm;

4. providing a roll of poly(ethyleneterephthalate) film to be used as top film 15 of the laminated product, the roll containing 3,300 yards of film having a thickness of 0.92 mil and a width of 56 inches;

5. applying the fluoroelastomer composition obtained in step (3) to one side of the film provided in step (4) to form discontinuous conductive elastomer layer 11; this is done by passing the film at a speed of 30 feet per minute through a Gravure print-coating apparatus so as to apply a printed layer of the fluoroelastomer composition having a thickness when dried of 0.25 mil and having a printed pattern such that the fluoroelastomer layer is divided into 13 inch by 54 inch coated areas 13 by the uncoated 3 inch by 54 inch spacing areas 12 and a one inch wide uncoated strip along each edge of the film; then the coated film is passed through a forced-air tunnel whose air temperature is about 110°C. to dry the conductive elastomer layer, and the coated film is wound up on a storage spool;

6. providing a roll of poly(ethyleneterephthalate) film to be used as bottom film 10 of the laminated product, this roll also containing 3,300 yards of 0.92 mil thick 56 inch wide film;

7. making a polyester adhesive composition by mixing 20 parts of a linear copolyester resin with 80 parts of a solvent for the resin composed of 50% toluene and 50% dioxane, said resin having been prepared in the manner described in U.S. Pat. No. 2,892,747, Example 1, by melt polymerizing a mixture of bis(ethylene glycol) esters of four acids in which the terephthalic acid content is 40 mol percent, the isophthalic acid content is 40 mol percent, the adipic acid content is 10 mol percent and the sebacic acid content is 10 mol percent;

8. applying a coat of the polyester adhesive obtained in step (7) to the entire surface of one side of the film provided in step (6); this is done by passing the film at a speed of 30 feet per minute through a Gravure coating apparatus to apply a continuous adhesive layer having a thickness when dried of 0.05 mil, drying the adhesive coated film in a drying tunnel at 110°C. and winding it on a storage spool;

9. preparing a quantity of adhesive-coated aluminum conductor wires; this is done by passing one-mil thick aluminum film from a 3,300 yard storage roll through a Gravure coating apparatus to apply a continuous 0.05 mil thick (when dried) coat of the adhesive to the entire surface of one side of the aluminum film, drying the adhesive coated film in a drying tunnel at 110°C., slitting it into three-fourth inch wide strips on a conventional slitting machine, and winding the resulting adhesive-coated wires on a storage spool; the adhesive used in a conductive polyester adhesive made by ball-milling 300 parts of the adhesive obtained in step (7) with 100 parts of tetrahydrofuran and 133 parts of acetylene black until the composition is substantially free of coarse particles;

10. continuously forming the laminated heating element by (a) simultaneously unwinding from the storage rolls the conductive elastomer-coated top film made in step (5), the polyester adhesive-coated bottom film made in step (8) and four of the polyester adhesive-coated conductor wires made in step (9), (b) passing these three components at a speed of 30 feet per minute into the nip between the 8 inch diameter 5 foot long smooth metal rolls of a two-roll press which applies a total pressure of about 7,000 pounds, only the top roll being heated (175°C.); the arrangement of the components entering the nip is such that the laminate leaving the nip has the structure illustrated in FIGS. 1 and 3 of the drawings and described further below;

11. passing the laminate from the nip of step (10) over two water-cooled rolls, and winding the laminate on a storage spool.

The resulting laminate has the following structure: The conductive elastomer-coated side of top film 15 is bonded to the polyester adhesive coated side of bottom film 10. Both edges of the product are sealed as illustrated by bonded edge 16 of FIG. 1. In the spacing areas 12, where there is no conductive elastomer layer, top film 15 is bonded to bottom film 10. The four adhesive-coated conductor wires 14 each has its bottom surface bonded to bottom film 10 by the adhesive coat on film 10; and each has its top surface bonded to conductive elastomer layer 11 in the elastomer-coated areas 13 and to top film 15 in the spacing areas by the adhesive coat on the wire's top surface. The wires are parallel and spaced so that there is an equal distance between each wire and the next one. At both sides of the product the outer edge of coated areas 13 is even with the outer edge of the adjacent wire 14.

The laminated heater prepared in Example 1 is exceptionally easy and economical to install in the manner described above and for the reasons described above. It also has other advantages of the type discussed above, including high durability, heating efficiency and flexibility, desirably low thickness and practical to manufacture rapidly by continuous methods. It is especially useful as a ceiling heater to be installed during the construction of mobile homes. It has a specific resistivity of 0.78 ohm-cm. at 21°C. Its heat production is 20 watts per square foot of coated area when one applies between adjacent electrodes 230 volts D.C. or 230 volts A.C. When used as a typical "behind-theceiling" installation where the laminated heater is fastened between the ceiling support members and any one of several typical ceiling materials, the heater operates at temperatures up to about 49°–71°C. depending on the thermal conductivity of the ceiling material.

EXAMPLE 2

Figure 2:
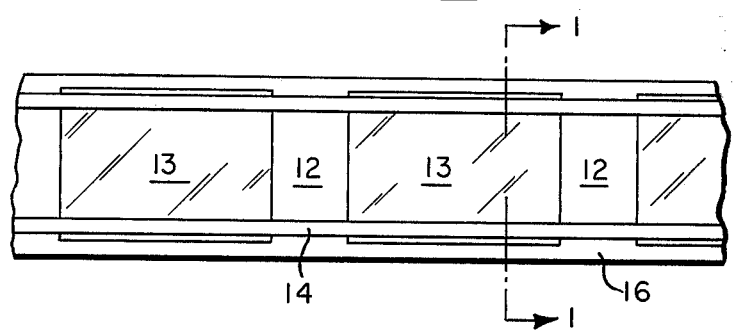
FIG. 2 is a bottom plan view of the embodiment shown in FIG. 1.

A useful laminated heater of the type illustrated in FIG. 2 of the drawing is prepared by repeating Example 1 except:

a. films 10 and 15 are 21 inches wide;

b. coated areas 13, instead of being 54 inches wide, are 19 inches wide (measured perpendicular to wires 14); and c. only two of the conductor wires are used.

This product also has beneficial utility as an easy-to-install, durable, flexible, thin and efficient heating element.

I claim:

1. A laminated structure useful as an electric heating element which comprises
   A. a bottom layer composed of a film of electrically insulating polymeric material,
   B. in superposed adherent relation with layer(A), a discontinuous layer of electrically conductive elastomeric material containing electrically conductive carbon black dispersed in a fluorocarbon elastomer, said discontinuous layer covering substantially all of layer(A) except for spacing areas which occur at predetermined intervals along the length of layer(A), said spacing areas extending across the width of layer(A) whereby layer(B) is divided into a series of coated areas of predetermined length, layer(B) having a thickness of about 0.05–0.45 mil,
   C. at least two spaced-apart conductor wires in intimate contact with layer(B) and extending substantially the entire length of the laminated structure, and bonded within the structure between layers(A) and (D), and
   D. a top layer composed of a film of electrically insulating polymeric material in superposed adherent contact with layer(B) and said spacing areas of layer(A),
   each of said layers(A) and (D) being a film of a highly flexible non-elastomeric durable plastic material having a thickness of about 0.5–15 mils, and
   said coated areas of layer(B) measuring about 11–15 inches, and said spacing areas measuring about 1–5 inches in the direction parallel with the conductor wires.

2. A structure according to claim 1 wherein the laminated structure has a width of about 50–60 inches, and component (C) consists of four substantially evenly spaced parallel conductor wires, the distance between each wire and the next one being about 16–20 inches; and each of said layers(A) and (D) is a polyester film.

3. A structure according to claim 1 wherein each of said film layers is a polyethyleneterephthalate film.

* * * * *